Dec. 22, 1931.  S. J. MONTGOMERY  1,837,982
CROSS CHAIN FASTENER
Filed Sept. 15, 1930    2 Sheets-Sheet 1
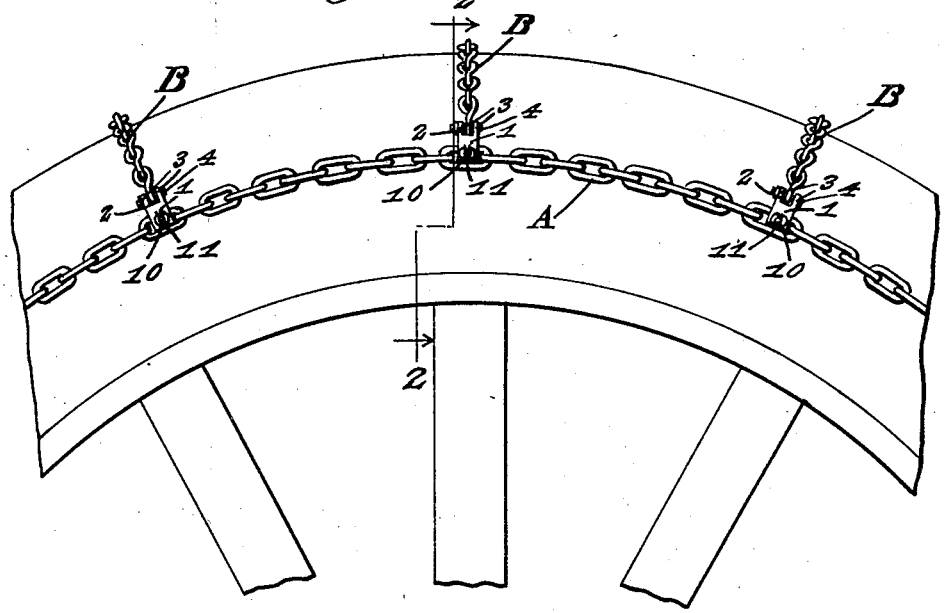
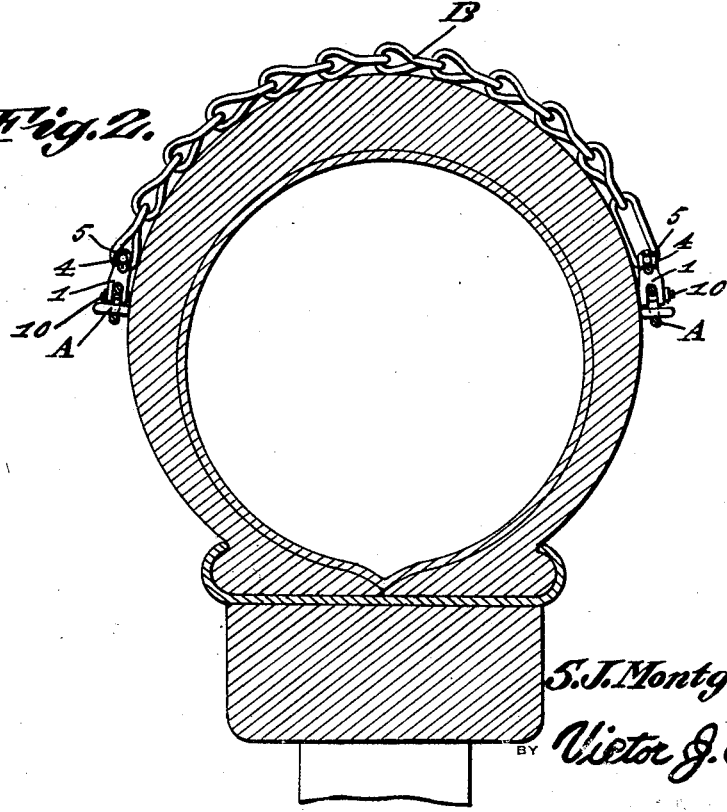
S. J. Montgomery,
INVENTOR
BY Victor J. Evans
ATTORNEY Dec. 22, 1931. S. J. MONTGOMERY 1,837,982
CROSS CHAIN FASTENER
Filed Sept. 15, 1930 2 Sheets-Sheet 2
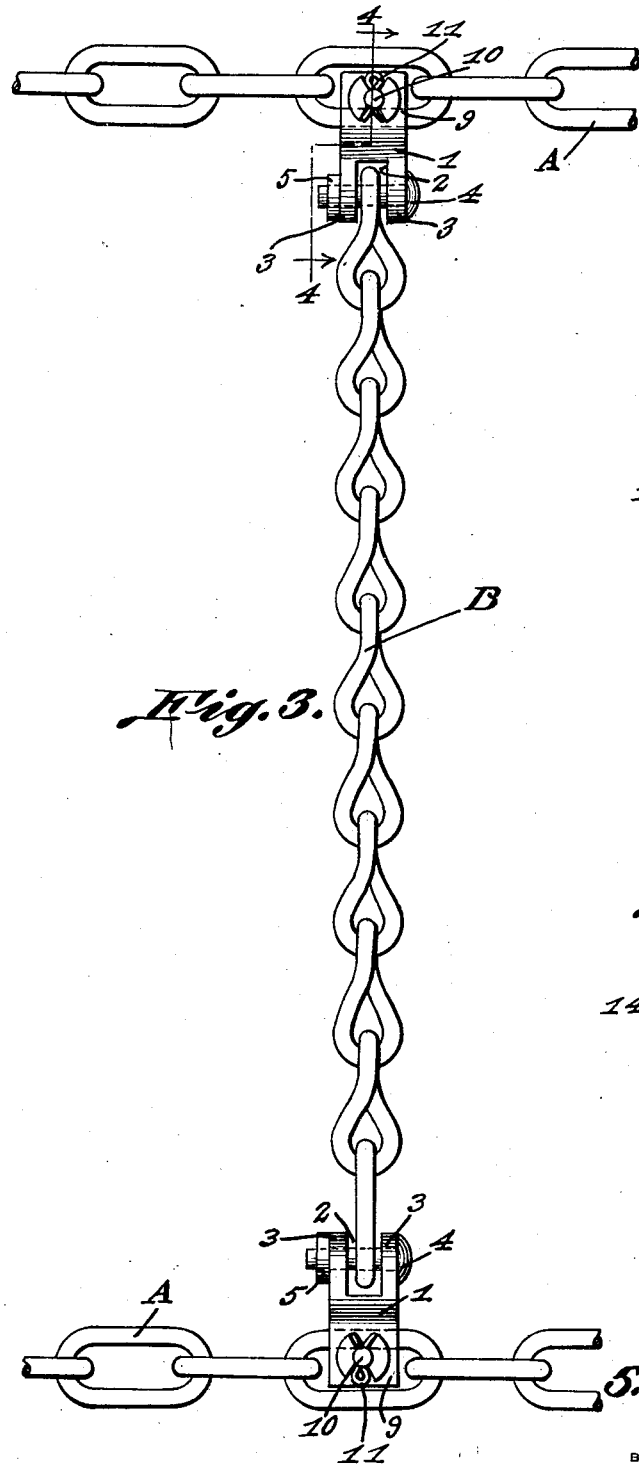
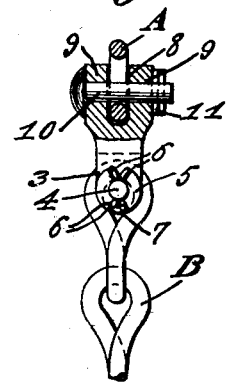
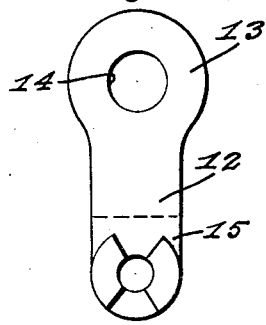
S. J. Montgomery, INVENTOR
BY Victor J. Evans
ATTORNEY Patented Dec. 22, 1931

1,837,982

UNITED STATES PATENT OFFICE

STONEWALL J. MONTGOMERY, OF CEDAR VALE, KANSAS

CROSS CHAIN FASTENER

Application filed September 15, 1930. Serial No. 482,109.

This invention relates to anti-skid chains for vehicle wheels, and its general object is to provide a fastener for detachably securing cross chains to the side chains of anti-skid chains in an easy and expeditious manner and without fear of casual separation.

Another object of the invention is to provide a fastener of the character set forth that not only securely detachably connects cross chains to the side chains of anti-skid chains, but the cross chains can be removed with very little effort when they have become worn or damaged and replaced by new cross chains, and the fastener will in no way affect or damage the tire.

A further object of the invention is to provide a fastening device for detachably securing cross chains to side chains, that can be associated with the cross chains and side chains without the use of special tools and in fact, can under some circumstances be fastened to the cross and side chains without any tool other than a screw driver or like tool having a beveled working edge.

Another object of the invention is to provide a fastening device for anti-skid chains for detachably connecting the cross chains to the side chains thereof, that is simple in construction, in expensive to manufacture and extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a fragmentary side elevation illustrating the application of my chain fastener to an anti-skid chain with the latter disposed upon the tire of a wheel of a vehicle.

Figure 2 is a sectional view taken approximately on line 2—2 of Figure 1.

Figure 3 is a top plan view illustrating the anti-skid chain and my fastener on an enlarged scale.

Figure 4 is a sectional view taken approximately on line 4—4 of Figure 2 looking in the direction of the arrows.

Figure 5 is a detail view illustrating a modified form of my fastener.

Referring to the drawings in detail, the letter A indicates the side chains of an anti-skid chain, while B indicates the cross chains substantially similar to the cross chains now commonly employed with anti-skid chains, but the usual clamping end links are removed and my fastener is substituted therefor as best shown in Figure 3 of the drawings.

One of my fasteners is employed at each of the ends of the cross chain and are not only detachably associated with the side chains but also with the cross chains, each of the fasteners including a body 1 having formed in one of the end portions thereof and terminating adjacent its center, is a recess 2 to provide parallel ears 3 which have aligned openings formed therein to accommodate headed pins 4 that pass through the openings and the end links of the cross chain, one of the end links being straight so that the cross chain will lie flat upon the tire as will be apparent upon inspection of Figure 1.

Formed with one of the parallel ears 3 are spaced lugs 5 which have converging confronting faces 6 arranged upon opposite sides of the opening of said ear as clearly shown in Figure 4. These converging confronting faces are adapted to provide bearing surfaces for cotter pins 7, and it will be apparent that by providing the lugs 5 that the cotter pin will be protected with the result damage or casual closing of the cotter pins will be eliminated.

Disposed in the opposite end portion of the body is a recess 8 that is arranged at right angles with respect to the recess 2, and the recess 8 is adapted to receive one of the links of the cross chains as shown in Figure 3, and provide parallel ears 9 that are likewise formed with openings to accommodate headed pins 10, the latter receiving cotter pins 11 and one of the ears 9 is also provided with spaced lugs similar to the lugs 5 for the protection of the cotter pins 11. It will be apparent that the headed pins 4 and 10 are provided with openings to accommodate the cotter pins.

The parallel ears 9 are provided with square corners as will be noted upon inspection of Figure 3 while the parallel ears 3 terminate in rounded ends and are of less width than the ears 9, as the ears 3 contact the tire, with the result they will not damage the tire due to the rounded ends.

In the form of the invention just described, the fasteners are detachably associated with respect to the cross and side chains respectively, while in the form of the invention as shown in Figure 5, the fasteners are permanently fixed to the cross chains and for this purpose, the bodies 12 thereof have formed therewith an enlarged rounded end 13 that is provided with a centrally disposed opening 14 for the purpose of receiving the end links of the cross chain. The opposite end portion of the body 12 is provided with a recess to form ears which are adapted to receive between the same one of the links of the side chains, and these ears which are indicated by the reference numeral 15 have openings to accommodate a headed pin provided with an opening in its end remote from its head to receive a cotter pin, the latter being protected in the same manner as in the form of the invention shown in Figures 1 to 4 inclusive, therefore the form of the invention as shown in Figure 5 is detachably associated with the side chains, but is permanently fixed with respect to the cross chains.

From the above description and disclosure of the drawings, it will be obvious that I have provided a fastening device whereby the cross chains are detachably associated with respect to the side chains, in a manner whereby casual separation thereof will be eliminated, but the chains can be connected with respect to each other in an expeditious manner and with very little effort.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A fastener comprising a body, means carried by one end portion of said body to receive the end links of a cross chain of anti-skid chains, ears formed with the opposite end portion thereof and adapted to receive a link of the side chains of said anti-skid chains, said ears being provided with openings, a headed pin passing through said openings for securing the link of the side chains between the ears, a cotter pin for securing the pin through the ears, and lugs formed with one of said ears and having their inner faces spaced and shaped to accommodate and protect the cotter pin.

2. A fastener comprising a body having an enlarged rounded end portion provided with an opening to accommodate one of the end links of the cross chain of anti-skid chains, the opposite end portion of said body being recessed to provide spaced parallel ears having openings formed therein, a pin adapted to be passed through the openings of said ears, a cotter pin for securing said pin through said ears, and lugs for protecting said cotter pin.

3. A fastener comprising a body, means included in and connected with said body for securing cross chains to the side chains of anti-skid chains, said means including ears, a headed pin passing through said ears, a cotter pin for securing said headed pin in operative position, and lugs having converging confronting faces engageable with said cotter pin to protect the latter.

In testimony whereof I affix my signature.

STONEWALL J. MONTGOMERY.